United States Patent
Majka et al.

(10) Patent No.: US 9,519,648 B2
(45) Date of Patent: Dec. 13, 2016

(54) SOFTWARE DETECTION

(75) Inventors: Grzegorz Majka, Cracow (PL); Artur Obrzut, Cracow (PL); Ryszard Olkusnik, Cracow (PL); Marcin Skalski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 13/609,459

(22) Filed: Sep. 11, 2012

(65) Prior Publication Data

US 2013/0080511 A1   Mar. 28, 2013

(30) Foreign Application Priority Data

Sep. 27, 2011  (EP) .................................... 11182917

(51) Int. Cl.
  *G06F 15/16* (2006.01)
  *G06F 17/30* (2006.01)
(52) U.S. Cl.
  CPC .............................. *G06F 17/30109* (2013.01)
(58) Field of Classification Search
  CPC .... G06F 21/50; G06F 17/30194; G06F 21/11; G06F 21/14; G06F 21/57; G06F 21/55; H04L 63/08
  USPC ....................................................... 709/203
  See application file for complete search history.

(56) References Cited

U.S. PATENT DOCUMENTS

| | | | | |
|---|---|---|---|---|
| 5,901,320 A | * | 5/1999 | Takahashi | G06F 8/71 709/223 |
| 6,195,587 B1 | * | 2/2001 | Hruska | G06F 21/564 700/2 |
| 6,880,107 B1 | * | 4/2005 | Kraft, IV | G06F 11/08 713/2 |
| 6,968,373 B1 | | 11/2005 | Norris et al. | |
| 6,973,491 B1 | * | 12/2005 | Staveley | H04L 41/0253 709/223 |
| 7,080,139 B1 | * | 7/2006 | Briggs | G06Q 30/02 707/999.003 |
| 8,943,031 B2 | * | 1/2015 | Karampuri | G06F 17/30194 707/697 |
| 2002/0083341 A1 | * | 6/2002 | Feuerstein | G06F 21/55 726/25 |
| 2004/0092255 A1 | * | 5/2004 | Ji | G06F 8/68 455/419 |
| 2004/0250167 A1 | * | 12/2004 | Sato | G06F 11/1433 714/6.1 |
| 2005/0278535 A1 | * | 12/2005 | Fortune | G06F 8/61 713/176 |
| 2006/0005248 A1 | * | 1/2006 | Wu | G06F 21/121 726/26 |
| 2006/0068755 A1 | * | 3/2006 | Shraim | H04L 12/585 455/410 |

(Continued)

*Primary Examiner* — Kevin Bates
*Assistant Examiner* — Clarence McCray
(74) *Attorney, Agent, or Firm* — Winstead, P.C.

(57) ABSTRACT

A method, system and computer program product for software discovery in a computer system comprising a server and a client. Data defining at least one file category is received at the client from the server. File information pertaining to files belonging to the respective file category is established at the client for each of the at least one file category. The file information for each of the at least one file category is communicated from the client to the server. For each of the at least one file category, a checksum is calculated from the file information.

17 Claims, 7 Drawing Sheets

(56) References Cited

U.S. PATENT DOCUMENTS

| | | | |
|---|---|---|---|
| 2007/0192853 A1* | 8/2007 | Shraim | G06Q 10/107 726/22 |
| 2008/0183864 A1 | 7/2008 | Bantz et al. | |
| 2008/0235664 A1* | 9/2008 | Carbone | G06F 8/60 717/120 |
| 2008/0244686 A1* | 10/2008 | Li | G06F 21/565 726/1 |
| 2009/0177800 A1* | 7/2009 | Gidron | H04L 67/34 709/248 |
| 2010/0011435 A1* | 1/2010 | Wee | H04L 67/06 726/15 |
| 2010/0293141 A1* | 11/2010 | Anand | G06F 8/71 707/640 |
| 2011/0093941 A1* | 4/2011 | Liu | G06F 9/44505 726/7 |
| 2011/0106616 A1* | 5/2011 | Bigby | G06Q 30/02 705/14.49 |
| 2013/0073525 A1* | 3/2013 | Damon | G06F 11/0751 707/691 |
| 2013/0080511 A1* | 3/2013 | Majka | G06F 17/30109 709/203 |
| 2014/0052705 A1* | 2/2014 | Karampuri | G06F 17/30194 707/697 |
| 2015/0350316 A1* | 12/2015 | Calder | H04L 67/1095 714/19 |

* cited by examiner

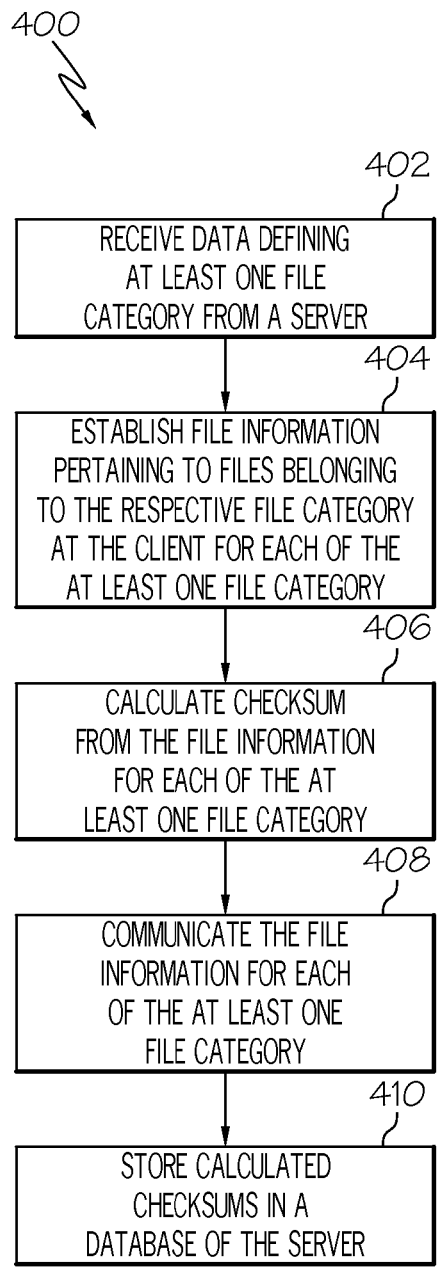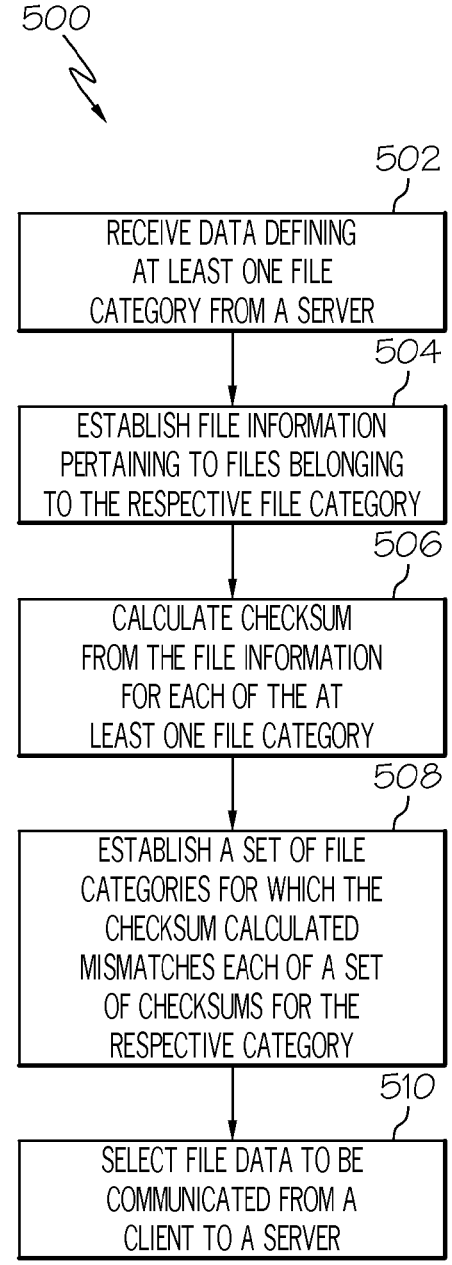
FIG. 4
FIG. 5

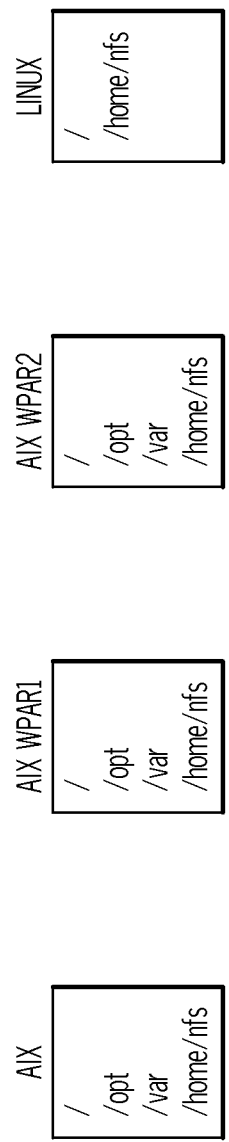

SOFTWARE DETECTION

CROSS-REFERENCE TO RELATED APPLICATIONS

This application claims priority under 35 U.S.C. §119(a) from European Patent Application No. 11182917.2, filed on Sep. 27, 2011, the contents of which are incorporated herein by reference.

TECHNICAL FIELD

The present invention relates generally to detecting software, and more particularly, to discovering software in a computer system comprising a server and a client.

BACKGROUND

Software detection may be carried out for various reasons. For example, software detection may be carried out for the sake of discovering software that is outdated that requires an update or needs to be removed from the system. Software detection may also be carried out for the sake of confirming proper licensing of the software installed in a computer system.

A software catalog may be used for properly identifying the various software products found during a scan of the computer system's file systems in the course of software detection. For example, the software catalog may specify file characteristics (e.g., file name and size) that uniquely identify the various software products listed in the software catalog.

In a computer system comprising a server and a client, the server may instruct the client to carry out some of the tasks involved in discovering software located on volumes local to the client. In this respect, there may be a communication of data between the server and the client.

BRIEF SUMMARY

In one embodiment of the present invention, a method for software discovery in a computer system (computer system comprising a server and a client) comprises receiving, at the client from the server, data defining at least one file category. The method further comprises establishing, at the client for each of the at least one file category, file information pertaining to files belonging to the respective file category. Additionally, the method comprises communicating the file information for each of the at least one file category from the client to the server. In addition, the method comprises calculating, by a processor, for each of the at least one file category, a checksum from the file information.

In another embodiment of the present invention, a method for software discovery in a computer system (computer system comprising a server and a client) comprises receiving, at the client from the server, data defining at least one file category. The method further comprises establishing, at the client for each of the at least one file category, file information pertaining to files belonging to the respective file category. Additionally, the method comprises calculating, for each of the at least one file category, a checksum from the file information. In addition, the method comprises establishing, by a processor, from among each of the at least one file category, a set of file categories for which the checksum mismatches each of a set of checksums stored in at least one of the server and the client.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 4 is a flowchart of a method for software discovery in accordance with an embodiment of the present invention;

FIG. 5 is a flowchart of a further method for software discovery in accordance with another embodiment of the present invention;

FIG. 6A schematically depicts the mount points of a software discovery system configured with four client in accordance with an embodiment of the present invention;

FIG. 6B schematically shows a workflow of the software discovery system shown in FIG. 6A in accordance with an embodiment of the present invention; and.

DETAILED DESCRIPTION

Figure 1:
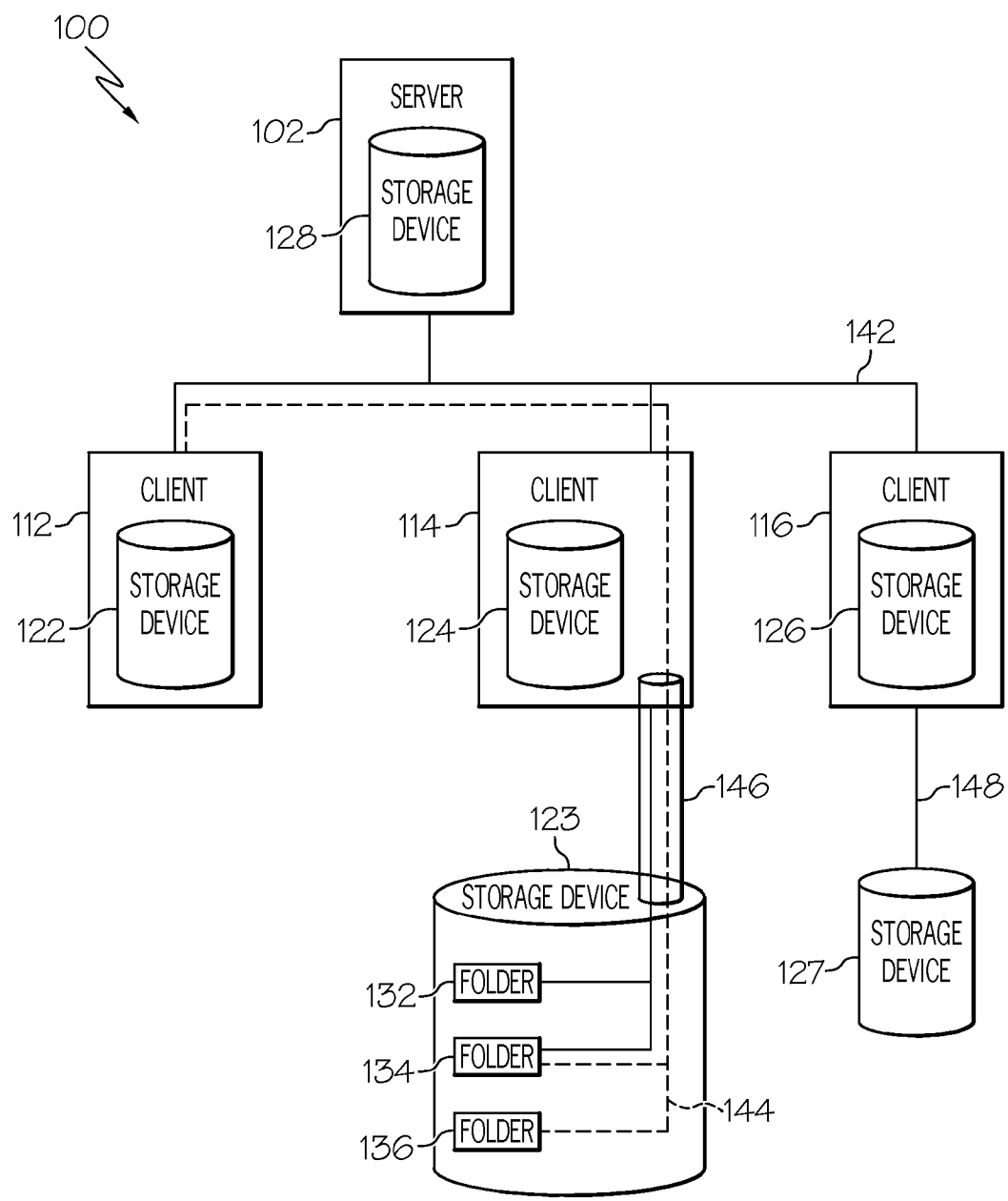
FIG. 1 schematically shows a computer system for use with a software discovery system in accordance with an embodiment of the present invention.

Loosely speaking, the present disclosure teaches techniques for detecting software in a computer system comprising a server and a client. The client scans for files that fulfill given requirements, e.g., for files in a given folder, for files of a given type, for files having a creation/modification time falling within a given range, etc. In other words, the client establishes a list of files for each of one or more categories, the individual categories being defined by respective requirements. The scanning may be limited to volumes located physically within the client or to volumes accessible solely via the client. A checksum is then calculated from one or more parameters of each of the files belonging to a respective list of files, e.g., from the file size, the creation/modification time, etc. The calculated checksum may be stored at the client and/or sent to the server for later use. The calculated checksum can be understood as a "fingerprint" of the list of files, i.e., allows differences in/changes to the list of files to be easily recognized with a high degree of certainty.

In what may be considered an independent aspect of the present disclosure, the client may (again) scan for files of the same categories and calculate a checksum. By comparing the checksum calculated from a list of files obtained by this scan with a checksum calculated by the same client at an earlier point in time or calculated by a different client, it is possible to ascertain the state of a category of files relative to a state of that category of files on the same client at an earlier point in time and/or on a different client. In particular, differences in/changes to that category of files can be readily ascertained. If the client reports file information pertaining to the files of a respective category to the server, the report can thus be limited to those categories of files that have changed since an earlier report and/or to file states that have not been reported by a different client. This can significantly reduce communication between the client and the server.

In one aspect, as touched upon supra, the present disclosure relates to a method for software discovery in a computer system. The computer system may comprise a server and a client.

In the context of the present disclosure, the term "software discovery" may be understood as carrying out an inventory of files located/software installed (hereinafter simply "files") on a computer system as a whole or within a limited realm of the computer system, e.g., files on volumes located on a given branch of a network belonging to the computer system, for example, files on volumes accessible solely via a given (client) computer. The scope of the inventory may be limited to one or more categories of files, each of the categories being defined by given requirements as will be described in further detail infra. The inventory may be carried out by any computing entity that has access to the realms of the computer system for which the inventory is to be carried out. Results of the inventory may be communicated to another computing entity. For example, the inventory may be carried out by a client that then sends results of the inventory to a server.

In the context of the present disclosure, the expression "computing entity" (occasionally just "entity" for the sake of better readability) may be understood as a software and/or hardware entity of the computer system that is capable of executing a computer program. As such, a computing entity may be a personal computer, a virtual machine, a rack or mainframe computer, etc.

In the context of the present disclosure, the term "server" may be understood as a computing entity within a computer network that provides computing services to a program running on another computing entity within the computer network. In the context of the present disclosure, such another computing entity may be understood as a "client." The designations "server" and "client" need not be absolute. In other words, what may be termed a "server" from one perspective may be termed a "client" from another perspective.

The method may comprise receiving data defining at least one file category. The data may be entered by a user, e.g., an administrator of the computer system. Similarly, the data may be predetermined data stored within the computing system, e.g., by a server of the computing system. The method may comprise receiving the data at a computing entity that will perform the aforementioned inventory. The method may comprise receiving the data at a client from a server.

Each file category may be defined by one or more file attributes, e.g., by file location, file extension, file permissions, file creation/modification time and/or file type. The file location may be specified in terms a mounting point, a path, an enclosing folder, etc.

The method may comprise establishing, for each of the one or more of the file categories (e.g., for each of the file categories), file information pertaining to files belonging to the respective file category. This establishing of file information may be understood as constituting the aforementioned inventory. The file information may include a file name, path, size, version and/or modification/creation time of the respective files. The method may comprise establishing the same type of file information for each file belonging to the respective file category. The method may comprise establishing the same type of file information for each file for which file information is established. In other words, the method may comprise establishing the same type of file information for each file, regardless of the file category of the respective file. Similarly, the type of file information established for each file may very depending on the respective file category. In other words, the type of file information established for each file of one file category may differ from the type of file information established for each file of another file category.

As touched upon above, the establishing may comprise scanning a file system for files belonging to the respective file category, e.g., searching the file system for all files having the file attributes defining the respective file category. The scanned file system may be a networked file system comprising a plurality of volumes. Similarly, the scanned file system may be a single volume physically located within a hardware entity carrying out the scan or one or more volumes accessible solely via a computing entity carrying out the scan, for example, volumes connected to a Universal Serial Bus (USB), Serial AT Attachment (SATA), Small Computer System Interface (SCSI), Peripheral Component Interconnect (PCI) or IEEE 1394 interface of a computer carrying out the scan. The establishing may furthermore comprise gathering the aforementioned file information for each of the files determined during the scanning to belong to the respective file category.

The method may comprise communicating the established file information for one or more or each of the file categories for which file information was established from a computing entity that carried out the establishing to another computing entity of the computer system. The computing entity and the other computing entity may have a client/server relationship where the other computing entity acts as a server for the computing entity.

The method may comprise calculating at least one checksum from the established file information for one or more or each of the file categories for which file information was established. The checksums may be calculated in any manner known in the art. For example, the checksums may be calculated by adding the digits of numeric file information or by adding the binary representations of alphanumeric file information. In cases where more than one checksum is calculated per file category, the respective checksums may be calculated from any set of file information selected from the file information established for the respective file category. The sets of file information may be, but need not be, non-overlapping. For example, a first checksum may be calculated from each of the file names and paths for the respective file category, a second checksum may be calculated from each of the file sizes and creation times for the respective file category, and a third checksum may be calculated from each of the file names and version numbers for the respective file category. The method may comprise calculating the at least one checksum based on the same type of file information for each file category, i.e., regardless of the file category. For example, the checksum could always be calculated solely from the files sizes for the respective file category. Similarly, the method may comprise calculating the at least one checksum based on different types of file information for each file category. For example, a first checksum may be calculated from the files sizes of all the files belonging to the category of files associated with a particular mounting point, e.g., the mounting point "/var" in a UNIX system, and a second checksum may be calculated from the version number of all the files belonging to the category of files of a particular file type in a particular folder, e.g., all the file type ".exe" in a folder "IBM Applications." The calculating of the at least one checksum can be carried out by any computing entity having access to the established file information. The calculating of the at least one checksum may be carried out by the computing entity that established the file information.

The method may comprise communicating one or more or all of the calculated checksums, directly or indirectly, from the computing entity that calculated the respective checksum to at least one other computing entity, e.g., to a server of the computer system.

The method may comprise storing one or more or all of the calculated checksums for one or more or each of the file categories in a database, e.g., in a database of a server of the computer system. The calculated checksums may be stored using the checksum as a key. This allows swift determination of whether a given checksum is known, i.e., stored.

The method may comprise establishing, from among one or more or each of the at least one file category, at least one set of file categories for which a calculated checksum for the respective category mismatches each of a set of checksums for the respective category.

The set of checksums may consist of one or more or all corresponding checksums for the respective category. In this disclosure, a "corresponding" checksum may be understood as a checksum that has been calculated from the same type of file information as the checksum to which it is being compared. The set of checksums may comprise/consist of one or more checksums stored in a client and/or server of the computer system as described above. The set of checksums may be limited to checksums that fulfill given selection criteria, e.g., were calculated within a given timeframe, were calculated based on file information obtained with regard to a given realm of the file system of the computer system, etc. Naturally, the set of checksums excludes the checksum to which the set of checksums is to be compared for the respective category.

The set of checksums may consist of a single checksum. Thus, this establishing may comprise establishing at least one set of file categories for which a calculated checksum for the respective category mismatches a corresponding (stored) checksum for the respective file category. For example, a checksum calculated for a given file category for a given realm of the file system of the computer system could be compared with a stored checksum previously calculated for the given file category for the given realm of the file system of the computer system. A checksum mismatch would then be indicative of a change within the given file category for the given realm of the file system.

Similarly, the set of checksums may comprise a plurality of checksums. Thus, this establishing may comprise establishing at least one set of file categories for which a calculated checksum for the respective category mismatches each of a plurality of corresponding (stored) checksums for the respective file category. For example, a checksum calculated for a given file category for a given realm of the file system of the computer system could be compared with each of a plurality of stored checksums, each having been previously calculated for the given file category for a respective realm of the file system of the computer system. A lack of matching checksums would then indicate that the file configuration in the given realm of the file system does not match the file configuration in the other realms of the file system, at least as regards the given file category.

The compared checksums may have been calculated based on file information obtained with regard to the same realm of the file system of the computer system or with regard to differing realms of the file system. For example, two different client computers may establish file information as described above for a given file category with respect to their respective local volumes. Checksums calculated from this file information may be exchanged, e.g., via a server. In this manner, each of the two clients and/or the server can establish mismatch between corresponding checksums obtained by the other of the two clients. The establishing of a set of file categories with checksum mismatch can be carried out by any computing entity having access to the underlying checksums.

The method may comprise selecting, based on one or more or each of the aforementioned sets of file categories, file data to be communicated from one computing entity to another computing entity. In other words, the file data may be selected as a function of one or more or each of the aforementioned sets of file categories, e.g., as a function of the respective file categories per se and/or as a function of one or more file attributes defining the respective file categories. The file data may be selected from the file information of one or more or all of the sets of file categories. The method may comprise communicating the file data from one computing entity to at least one other computing entity, e.g., from a client to a server. The selecting may comprise selecting file data from an intersection of file information of a first file category of the sets of file categories and file information of a second file category of the sets of file categories.

The selection of file data based on sets of file categories for which a checksum mismatch has been ascertained, i.e., for file categories where a difference and/or change in the associated files has been detected, allows such file data to be focused on such differences/changes and for a correspondingly focused response to such differences/changes. For example, if it is ascertained that, of the file categories specifying file location, solely the checksum for files from the folder "IBM Applications" has changed/does not match known checksums and that, of the file categories specifying file type, solely the checksum for files of type ".exe" has changed/does not match known checksums, then it could suffice to select and send, as the aforementioned file data, just file information relating to files of type ".exe" in folder "IBM Applications," the file information relating to files of other types and at other locations being known from other scans.

The selection of file data may be carried out by a computing entity that differs from the computing entity that communicates the file data. For example, a server may, after having established a set of file categories exhibiting checksum mismatch, instruct a client to send file data relating to files of a file category where the most recent checksum mismatches earlier checksums of the same file category. The earlier checksum may be from the same client or another client. In the above example, for instance, the server may instruct the client to send just file information relating to files of type ".exe" in folder "IBM Applications" to the server. In this manner, the server can update its inventory information for that client without undue communication of file information across the network connecting the server and the client.

Any receiving, establishing, communicating, calculating and/or selecting as discussed hereinabove may be carried out automatically, e.g., without user interaction or with limited user interaction.

While the teachings of the present disclosure have been discussed hereinabove in the form of a method, the teachings may be embodied, mutatis mutandis, in the form of a system, i.e., a software discovery system, or a computer program product, as will be appreciated by the person skilled in the art.

The software discovery system may comprise a file category information system that communicates data defining at least one file category as discussed hereinabove.

The software discovery system may comprise a file information establishing system that establishes file information pertaining to files belonging to a respective file category as discussed hereinabove.

The software discovery system may comprise a file information communication system that communicates file information as discussed hereinabove.

The software discovery system may comprise a checksum calculation system that calculates at least one checksum as discussed hereinabove.

The software discovery system may comprise a checksum comparator that establishes a set of file categories for which a checksum mismatches each of a set of checksums as described above.

The software discovery system may comprise a file data selection system that selects file data to be communicated as described above.

The software discovery system may comprise a file data communication system that communicates file data as described above.

The software discovery system may comprise a checksum communication system that communicates a calculated checksum as described above.

Each of the file category information system, the file information establishing system, the file information communication system, the checksum calculation system, the checksum comparator, the file data selection system, the file data communication system and the checksum communication system or any group thereof may be embodied in the form of a single unit comprising hardware and/or software or in the form of a system comprising multiple hardware/software units.

Referring now to the Figures, FIG. 1 shows an embodiment of a computer system 100 for use with a software discovery system in accordance with an embodiment of the present invention.

In the illustrated embodiment, computer system 100 comprises a server 102 as well as three clients 112, 114, 116. The server 102 is in network communication with each of clients 112, 114, 116 via a network connection 142. Server 102 comprises a storage device 128. Client 112 comprises a storage device 122 in the form of an internal hard disk. Client 114 comprises a storage device 124 in the form of an internal hard disk. Client 114 is moreover in communication with a storage device 123 in the form of an external hard disk via a network connection 146, e.g., via an IEEE 1394 interface. Client 116 comprises a storage device 126 in the form of an internal hard disk. Client 116 is moreover in communication with a storage device 127 in the form of an external hard disk via a network connection 148, e.g., via a USB interface.

Storage device 123 comprises a plurality of folders 132, 134, 136. Client 112 is able to read and write to folders 134, 136 via a network connection 144 shown as a dashed line, network connection 144 being established by network connection 142, client 114 and network connection 146. Client 114 is able to read and write to folders 132, 134 via network connection 146.

Figure 2:
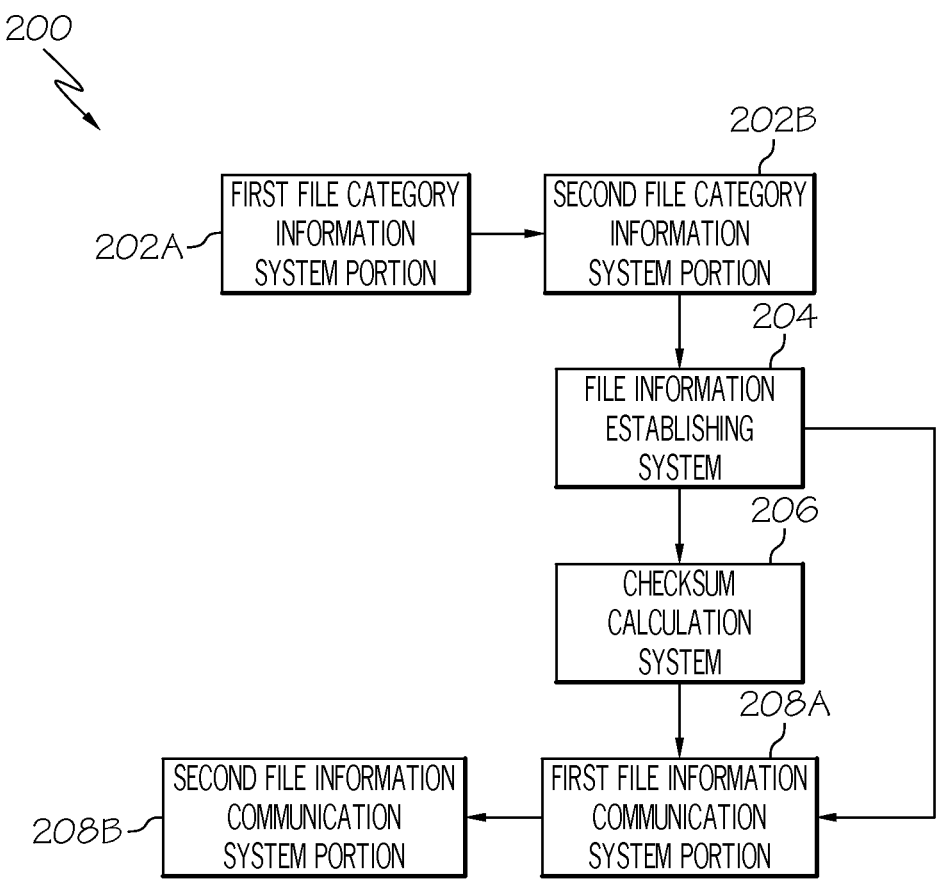
FIG. 2 schematically shows a software discovery system in accordance with an embodiment of the present invention.

FIG. 2 schematically shows an embodiment of a software discovery system 200 in accordance with an embodiment of the present invention.

In the illustrated embodiment, software discovery system 200 comprises a file category information system 202 comprising a first file category information system portion 202A and a second file category information system portion 202B, a file information establishing system 204, a checksum calculation system 206 and a file information communication system 208 comprising a first file information communication system portion 208A and a second file information communication system portion 208B. As symbolized by arrows in FIG. 2, the individual elements of software discovery system 200 are configured to communicate information.

First file category information system portion 202A and second file information communication system portion 208B may be elements of a server, e.g., server 102 of FIG. 1. Second file category information system portion 202B, file information establishing system 204, checksum calculation system 206 and first file information communication system portion 208A may be elements of a client, e.g., client 112 of FIG. 1.

Figure 3:
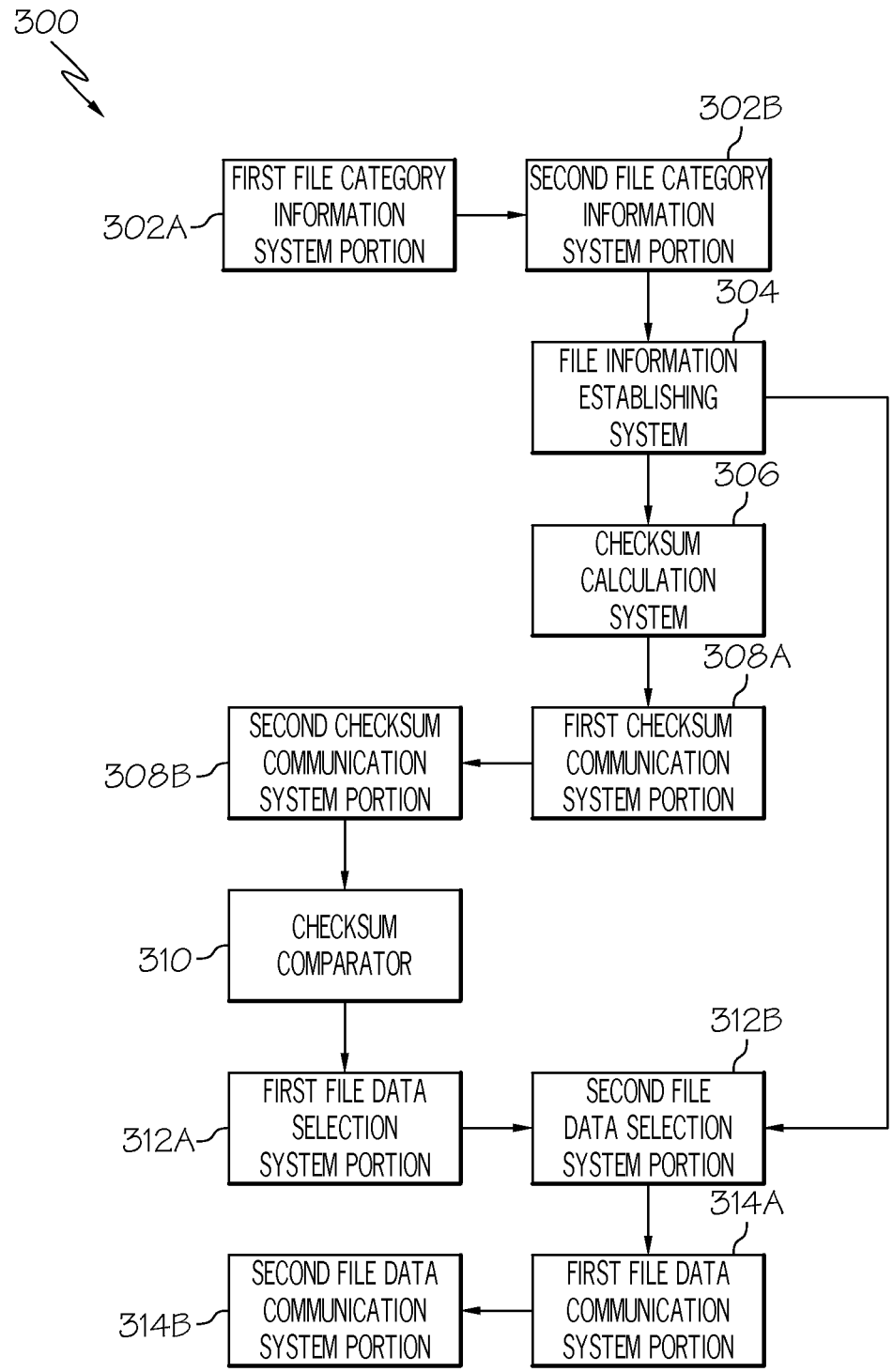
FIG. 3 schematically shows a further software discovery system in accordance with another embodiment of the present invention.

FIG. 3 schematically shows another embodiment of a software discovery system 300 in accordance with an embodiment of the present invention.

In the illustrated embodiment, software discovery system 300 comprises a file category information system 302 comprising a first file category information system portion 302A and a second file category information system portion 302B, a file information establishing system 304, a checksum calculation system 306, a checksum communication system 308 comprising a first checksum communication system portion 308A and a second checksum communication system portion 308B, a checksum comparator 310, a file data selection system 312 comprising a first file data selection system portion 312A and a second file data selection system portion 312B and a file data communication system 314 comprising a first file data communication system portion 314A and a second file data communication system portion 314B. As symbolized by arrows in FIG. 3, the individual elements of software discovery system 300 are configured to communicate information.

First file category information system portion 302A, second checksum communication system portion 308B, checksum comparator 310, first file data selection system portion 312A and second file data communication system portion 314B may be elements of a server, e.g., server 102 of FIG. 1. Second file category information system portion 302B, file information establishing system 304, checksum calculation system 306, first checksum communication system portion 308A, second file data selection system portion 312B and first file data communication system portion 314A may be elements of a client, e.g., client 112 of FIG. 1.

FIG. 4 is a flowchart of a method 400 for software discovery in accordance with an embodiment of the present invention.

Referring to FIG. 4, in conjunction with FIGS. 1-3, in step 402, a client receives data defining at least one file category from a server. For example, first file category information system portion 202A located in client 112 may receive data defining at least one file category from second file category information system portion 202B located in server 102. In this respect, second file category information system portion 202B may obtain a corresponding user input for defining the at least one file category. For example, the user input may specify that clients only scan for executable files, all internal drives being scanned in full and all external drives only being scanned with respect to folders for which the client machine has write permission.

In step 404, file information pertaining to files belonging to the respective file category is established at the client for each of the at least one file category. For example, the data received by first file category information system portion 202A may be communicated to file information establishing system 204 located in client 112 and file information establishing system 204 may establish file information accordingly. For example, continuing with the aforementioned example, file information establishing system 204 may establish a list containing the file name and file size of all executable files located on storage device 122, i.e., belonging to the category executable files on an internal drive. Presuming that client 112 only has read permission for folder 134, but has write permission for folder 136, file information establishing system 204 may moreover establish a list containing the file name and file size for all executable files located in folder 136, i.e., belonging to the category executable files on an external drive in a folder for which the client machine has write permission.

In step 406, a checksum is calculated from the file information for each of the at least one file category. For example, checksum calculation system 206 located in client 112 may receive the aforementioned file information, i.e., lists, from file information establishing system 204 and calculate a checksum from the respective file size of each of the files belonging to the "internal drive" category as well as a checksum from the respective file size of each of the files belonging to the "external drive" category.

In step 408, the file information for each of the at least one file category is communicated from the client to the server. For example, first file information communication system portion 208A may receive the aforementioned file information, i.e., lists, from file information establishing system 204 and communicate this file information to second file information communication system portion 208B located in server 102. First file information communication system portion 208A may also receive the calculated checksums from checksum calculation system 206 and communicate these calculated checksums, e.g., together with the corresponding file information, to second file information communication system portion 208B.

In optional step 410, the calculated checksums communicated to second file information communication system portion 208B are stored in a database of the server, e.g., in a database on storage device 128 of server 102. Step 410 may include storing the corresponding file information communicated to second file information communication system portion 208B in the database of the server.

FIG. 5 is a flowchart of an additional method 500 for software discovery in accordance with another embodiment of the present invention.

Referring to FIG. 5, in conjunction with FIGS. 1-4, in step 502, a client receives data defining at least one file category from a server, such as described above with respect to step 402 supra.

In step 504, file information pertaining to files belonging to the respective file category is established at the client for each of the at least one file category, such as described with respect to step 404 supra.

In step 506, a checksum is calculated from the file information for each of the at least one file category, such as described with respect to step 406 supra. The calculated checksum may be stored.

In step 508, a set of file categories is established for which the checksum calculated at step 506 mismatches each of a set of checksums for the respective category. For example, checksum comparator 310 may obtain a calculated checksum for each of a plurality of file categories from checksum calculation system 306 via checksum communication system 308. Checksum comparator 310 may then compare the calculated checksum for each of the plurality of file categories with one or more or all previously calculated checksums for the respective file category stored in storage device 128 and create, i.e., establish, a set of file categories containing only those file categories for which the aforementioned comparison yielded no match. Such mismatch is indicative of a change to/difference in the files belonging to that category.

In optional step 510, file data to be communicated from a client to a server is selected based on the aforementioned set of file categories. The file data is selected from the file information of the set of file categories, i.e., from file information as established in step 504 pertaining to at least one file belonging to at least one of the file categories in the set of file categories. For example, if it is ascertained that, of the file categories specifying file location, solely the checksum for files from the folder "IBM Applications" on storage device 122 has changed/does not match known checksums and that, of the file categories specifying file type, solely the checksum for files of type ".exe" has changed/does not match known checksums, then it could suffice to select and send, as the aforementioned file data, just file information relating to files of type ".exe" in folder "IBM Applications" from client 112 to the server 102. To this respect, first file data selection system portion 312A located in server 102 may perform the aforementioned selection of file data and communicate to second file data selection system portion 312B located in client 112 that file information relating to files of type ".exe" in folder "IBM Applications" on storage device 122 is to be communicated to server 102, e.g., via first file data communication system portion 314A and second file data communication system portion 314B.

Figure 6B:
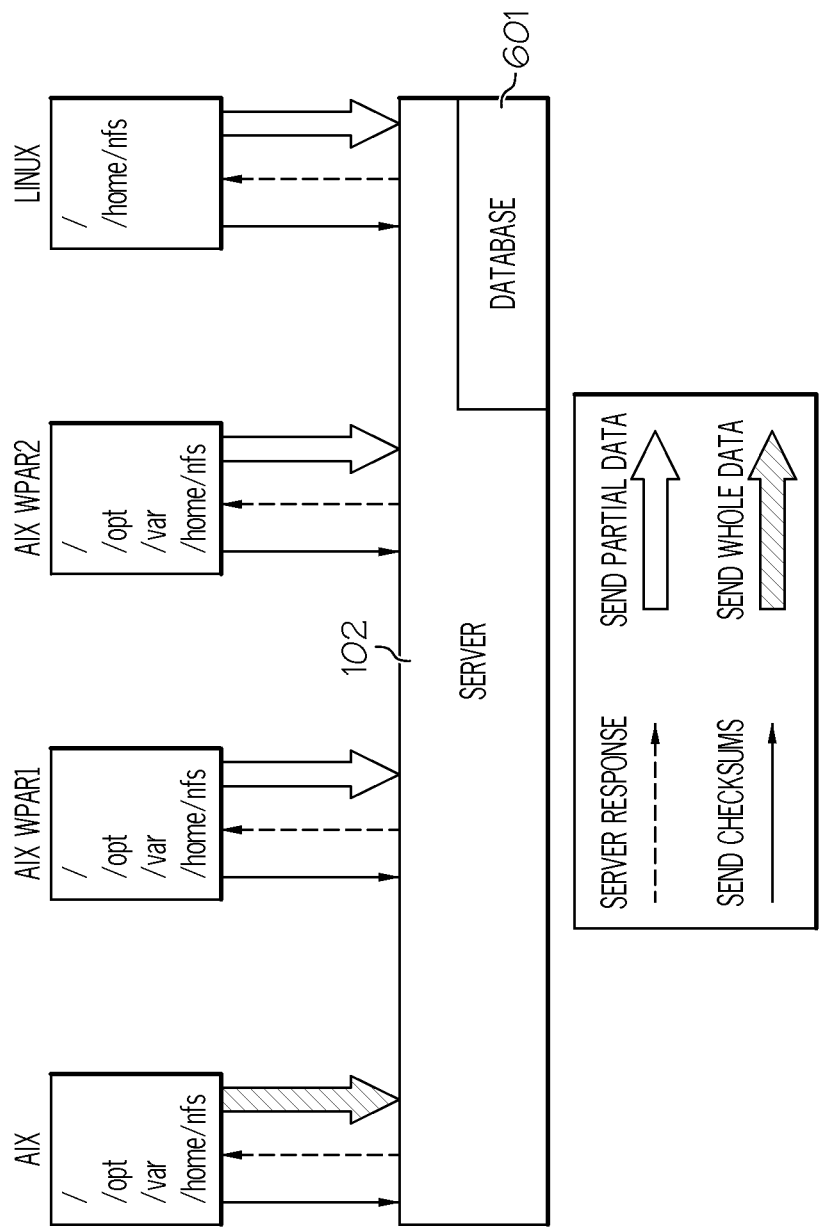

The aforementioned features of the present disclosure can also be embodied as described hereinbelow with reference to FIGS. 6A and 6B. FIG. 6A schematically shows an embodiment of a software discovery system in accordance with an embodiment of the present invention. In particular, FIG. 6A schematically depicts the mount points of a software discovery system configured with the four clients. FIG. 6B schematically shows an embodiment of the present invention of a workflow of the software discovery system shown in FIG. 6A.

One idea of the present disclosure is to reuse information from software scans that have already been done and are available on the server side. This way a CPU usage of a server and the network utilization will be reduced. A customer will get the inventory results and the software reports faster. The idea is to reuse data not only from one machine, but from many or all machines that already provided data to a server. It is often that end user systems are similar. For example, multiple users may use the same software and the same versions thereof (e.g., the same office programs, same browsers, same specialized software, same tools etc.).

Such reuse of information can be achieved by introducing checksums in the scan results. Checksums can be grouped into different categories. The following exemplary types/categories of checksums are proposed:
- for whole scan (one checksum).
- for mount points (on Unix system, like /opt /var /mnt).
- for custom paths—in this scenario, an administrator may define custom directories according to his best knowledge about infrastructure in order to gain the best results. For example, for a Windows scan group (agents located on Windows machines) an administrator may decide to create only 2 custom paths in this category: "Program Files" path and for rest of paths. The product can also have some default paths defined based on the typical configurations.
- for file extensions (or executable rights for a file on Unix)—checksums will be generated for each list of files with the same file extension, e.g., sig2, exe, txt and for a list of executable files (Unix).
- for file creation/modification time ranges—ranges of creation/modification time will be defined and for each list of files, which fall in a given range, a checksum will be generated.
- other categories can be provided as needed. For example, an end-user may define custom categories and link them in a form of a plugin.

Every agent, located on a client machine, may calculate checksums for any category specified by a server. The actual checksum is generated for data that may have the form of a list containing, for example: a file name, path, size, version (optional on windows), modification/creation time.

An exemplary scenario for such an approach is as follows:
1. Initial Setup
   a. on a server, an administrator creates a set of rules for clients. The rules contain/define categories for which checksums are to be created. These can be: directories, file extensions, create time ranges, etc. as described above.
   b. the rules are sent to all the clients.
2. The First Scan (No Data Exists on a Server)
   a. each client performs a scan of the whole (local) file system, groups the results according to above rules and computes the respective checksums.
   b. each client sends the list of checksums (grouped by categories) to a server.
   c. the server requests a full data from a client scan.
   d. the server creates a database of checksums and corresponding data in all categories.
3. Scan from Other Machines (Matching Data can be Possibly Found on a Server)
   a. another client runs a scan and sends the checksums (grouped by categories) to the server.
   b. the server determines if the checksums already exist in the database.
   c. the server requests only the missing parts of data from a scan from a client.
   d. all new checksums are added to the database.
4. Next Scan on the Same Machine
   a. after the second scan, a client finds only differences compared to a previous local scan—a "delta." If a checksum for all files is the same, a client just informs a server that nothing has changed. If anything changed, only the differences are sent.
   b. an intersection of one or more or all sets may be used. For example, if checksums have changed only for "exe" extension and in the "Program Files\Microsoft*" path, a client has to send only a list of files with "exe" extension from inside of "Program Files\Microsoft" directory. It significantly decreases the size of data, which have to be sent by clients.
   c. the server compares new checksums with its database, so it is possible that some of the checksums are already reported by other clients.

The teachings of the present disclosure yield particularly good results in the following, exemplary client machine configurations:
1. many client machines having similar software in well defined categories, e.g.,
   preconfigured laptops in corporation where a user is not allowed to install anything as it can be done only by IT department.
   users in a company that use common software products that are located usually in a default location suggested by an installer.
2. all users have automatic updates—only a first client has to send data to a server.
3. clients with shared disks (mounted network file systems).
4. diskless machines—it is enough if one client sends the common data.

FIGS. 6A and 6B illustrate how the aforementioned teachings can be applied in the case of four clients and a server with the following configuration:
   client machines: three AIX machines (AIX LPAR and two WPARs, which are installed inside the LPAR) and one Linux machine. The WPAR specification states that the /opt directory is common for WPARS on the same system (for isolated WPARs).
   all four client machines have /home/nfs network file system mounted.
   calculation of checksums is based on mount points.

FIG. 6A schematically depicts the mount points for the four clients. FIG. 6B depicts a corresponding workflow. The workflow can be described as follows:
   all clients perform software scans.
   all clients compute checksums for each mount point.
   AIX client sends checksums to a server 102.
   a server does not find these checksums in a database 601.
   AIX client is requested to send the whole data.
   as a next step, both AIX WPARs send their checksums to a server 102.
   checksums for /opt and /home/nfs mount points are available in a server database 601.
   AIX WPARs clients are requested by a server 102 to send partial data only ('/' and '/var' only).
   a server 102 receives the data and stores it in a database 601 as a pair of key (checksum) and value (scan data, which is a list of files with attributes). This will be done in another thread.
   during this operation a Linux client sends its checksums.
   a checksum for /home/nfs mount point exists in a database 601.
   a Linux client is requested by a server 102 to send partial data only (without /home/nfs).
   a server finishes storing AIX WPARs data and starts the process for a Linux software.

The following discusses how the aforementioned teachings can be applied by combining two categories of checksums. The environment configuration is:
   several Windows machines.
   several Unix systems.
   an administrator decides to calculate checksums only for a Windows scan group.

The configuration of the checksum categories is:
file extensions: sys2, exe, com
custom paths: PROGRAM_FILES, REST_OF_FILE_SYSTEM
The workflow can be described as follows:
all windows clients perform software scans.
all windows clients compute checksums for each file extension (SYS2, EXE, COM) and for each path (PROGRAM_FILES/Microsoft, PROGRAM_FILES/IBM, REST_OF_PROGRAM_FILES, REST_OF_FILE_SYSTEM).
a Windows client No. 1 sends checksums to a server.
The following table reflects exemplary checksum values for a client No. 1.

| checksum | value |
|---|---|
| SYS2 | 123 |
| EXE | 234 |
| COM | 345 |
| PROGRAM_FILES/Microsoft | 456 |
| PROGRAM_FILES/IBM | 895 |
| REST_OF_PROGRAM_FILES | 995 |
| REST_OF_FILE_SYSTEM | 567 | a server does not find these checksums in a database.
a Windows client No. 1 is requested by a server to send the whole scan data.
Assuming that a software configuration changed on the Windows client No. 1, it performs the scan again, the local agent compares checksums with the previous values for each category, it discovers that checksums changed, but only for EXE extension and for PROGRAM_FILES/Microsoft custom path. Having this knowledge it combines both categories and decides to send the partial data only to a server, which will be only the list of EXE files from PROGRAM_FILES/Microsoft path. When the data is received by a server, it updates only a list of software products represented by EXE extension and located inside PROGRAM_FILES/Microsoft directory. A server knows that the rest of the software configuration did not change.
The following table reflects exemplary checksum values for client No. 1 after change.

| checksum | value |
|---|---|
| SYS2 | 123 |
| EXE | 222 (checksum changed) |
| COM | 345 |
| PROGRAM_FILES/Microsoft | 444 (checksum changed) |
| PROGRAM_FILES/IBM | 895 |
| REST_OF_PROGRAM_FILES | 995 |
| REST_OF_FILE_SYSTEM | 567 | the other Windows clients send the checksum information to the server. If the checksum values match any of the values in the two tables above, the clients are requested to send only partial data. This is likely if well-defined custom paths exist, e.g., if many users have the same content of PROGRAM_FILES/Microsoft directory. If all checksums match, no data is sent.

Figure 7:
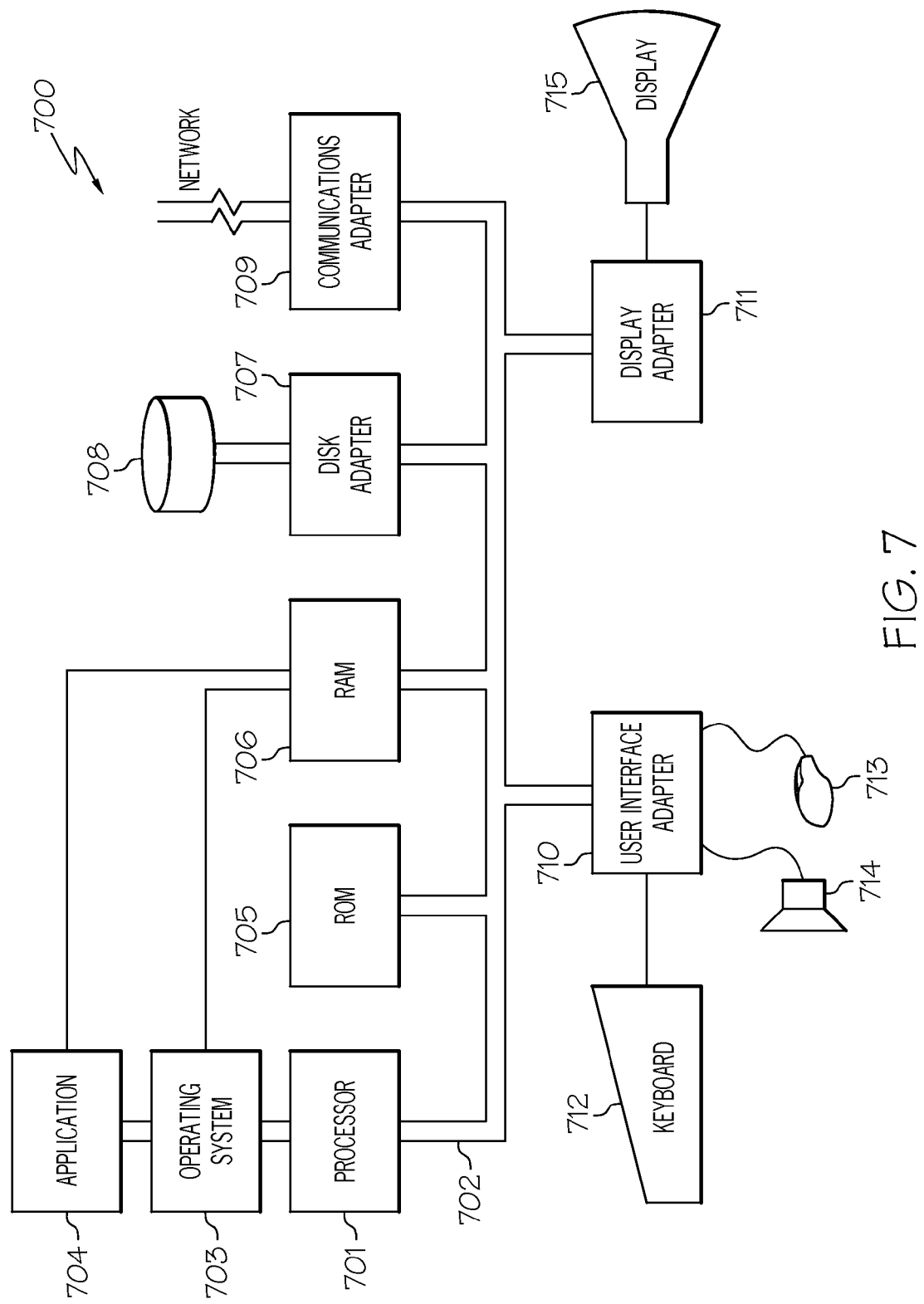
FIG. 7 depicts an embodiment of a hardware configuration of a computer system which is representative of a hardware environment for practicing the present invention.

FIG. 7 depicts an embodiment of a hardware configuration of a computer system 700 which is representative of a hardware environment for practicing the present invention. Referring to FIG. 7, computer system 700 has a processor 701 coupled to various other components by system bus 702. An operating system 703 may run on processor 701 and provide control and coordinate the functions of the various components of FIG. 7. An application 704 in accordance with the principles of the present invention may run in conjunction with operating system 703 and provide calls to operating system 703 where the calls implement the various functions or services to be performed by application 704. Application 704 may include, for example, an application for software discovery as discussed above.

Referring again to FIG. 7, read-only memory ("ROM") 705 may be coupled to system bus 702 and include a basic input/output system ("BIOS") that controls certain basic functions of computer system 700. Random access memory ("RAM") 706 and disk adapter 707 may also be coupled to system bus 702. It should be noted that software components including operating system 703 and application 704 may be loaded into RAM 706, which may be computer system's 700 main memory for execution. Disk adapter 707 may be an integrated drive electronics ("IDE") adapter that communicates with a disk unit 708, e.g., disk drive.

Computer system 700 may further include a communications adapter 709 coupled to bus 702. Communications adapter 709 may interconnect bus 702 with an outside network thereby allowing computer system 700 to communicate with other similar devices.

I/O devices may also be connected to computer system 700 via a user interface adapter 710 and a display adapter 711. Keyboard 712, mouse 713 and speaker 714 may all be interconnected to bus 702 through user interface adapter 710. A display monitor 715 may be connected to system bus 702 by display adapter 711. In this manner, a user is capable of inputting to computer system 700 through keyboard 712 or mouse 713 and receiving output from computer system 700 via display 715 or speaker 714.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for software discovery in a computer system comprising a server and a client, the method comprising:
   receiving, at said client from said server, data defining at least one file category based on one or more file attributes;
   establishing, at said client for each of said at least one file category, file information pertaining to files belonging to the respective file category;
   communicating said file information for each of said at least one file category from said client to said server;
   calculating, by a processor, for each of said at least one file category, a checksum from said file information; and
   comparing said checksum for a given file category for a given realm of a file system with a previously calculated checksum for said given file category for said given realm of said file system, wherein a checksum mismatch indicates a change within said given file category for said given realm of said file system.

2. The method as recited in claim 1 further comprising:
   storing, for each of said at least one file category, said calculated checksum in a database of said server.

3. A method for software discovery in a computer system comprising a server and a client, the method comprising:
   receiving, at said client from said server, data defining at least one file category based on one or more file attributes;
   establishing, at said client for each of said at least one file category, file information pertaining to files belonging to the respective file category;
   calculating, for each of said at least one file category, a checksum from said file information; and
   establishing, by a processor, from among each of said at least one file category, a set of file categories for which said checksum mismatches a corresponding checksum for the respective file category stored in at least one of said server and said client.

4. The method as recited in claim 3 further comprising:
   selecting, based on said set of file categories, file data to be communicated from said client to said server, said file data being selected from said file information of said set of file categories; and
   communicating said file data from said client to said server.

5. The method as recited in claim 4, wherein said selecting comprises selecting said file data from an intersection of file information of a first file category of said set of file categories and file information of a second file category of said set of file categories.

6. The method as recited in claim 3 further comprising:
   communicating, for each of said set of file categories, said calculated checksum from said client to said server.

7. The method as recited in claim 3, wherein said files are files located on a volume accessible solely via said client.

8. A computer program product embodied in a non-transitory computer readable storage medium for software discovery in a computer system comprising a server and a client, the computer program product comprising the programming instructions for:

receiving, at said client from said server, data defining at least one file category based on one or more file attributes;

establishing, at said client for each of said at least one file category, file information pertaining to files belonging to the respective file category;

calculating, for each of said at least one file category, a checksum from said file information; and establishing from among each of said at least one file category, a set of file categories for which said checksum mismatches a corresponding checksum for the respective file category stored in at least one of said server and said client.

9. The computer program product as recited in claim 8 further comprising the programming instructions for:

selecting, based on said set of file categories, file data to be communicated from said client to said server, said file data being selected from said file information of said set of file categories; and communicating said file data from said client to said server.

10. The computer program product as recited in claim 9, wherein the programming instructions for selecting comprises the programming instructions for selecting said file data from an intersection of file information of a first file category of said set of file categories and file information of a second file category of said set of file categories.

11. The computer program product as recited in claim 8 further comprising the programming instructions for:

communicating, for each of said set of file categories, said calculated checksum from said client to said server.

12. The computer program product as recited in claim 8, wherein said files are files located on a volume accessible solely via said client.

13. A system, comprising:

a memory unit for storing a computer program for software discovery in a computer system comprising a server and a client; and a processor coupled to the memory unit, wherein the processor, responsive to the computer program, comprises:

circuitry for communicating data defining at least one file category based on one or more file attributes from said server to said client;

circuitry for establishing, at said client for each of said at least one file category, file information pertaining to files belonging to the respective file category;

circuitry for calculating, for each of said at least one file category, a checksum from said file information; and circuitry for establishing from among each of said at least one file category, a set of file categories for which said checksum mismatches a corresponding checksum for the respective file category stored in at least one of said server and said client.

14. The system as recited in claim 13, wherein said processor further comprises:

circuitry for selecting, based on said set of file categories, file data to be communicated from said client to said server, said file data being selected from said file information of said set of file categories; and circuitry for communicating said file data from said client to said server.

15. The system as recited in claim 14, wherein the circuitry for selecting comprises circuitry for selecting said file data from an intersection of file information of a first file category of said set of file categories and file information of a second file category of said set of file categories.

16. The system as recited in claim 13, wherein said processor further comprises:

circuitry for communicating, for each of said set of file categories, said calculated checksum from said client to said server.

17. The system as recited in claim 13, wherein said files are files located on a volume accessible solely via said client.

\* \* \* \* \*